United States Patent [19]

Harms et al.

[11] 3,753,729
[45] Aug. 21, 1973

[54] METHOD FOR PREPARING FOOD SNACK COMPOSITIONS

[75] Inventors: Van Deursen Harms, Homewood; Edward R. Jensen, Hinsdale; Robert E. Langan, Wilmette, all of Ill.

[73] Assignee: CPC International Inc.

[22] Filed: Feb. 10, 1972

[21] Appl. No.: 225,289

Related U.S. Application Data

[63] Continuation-in-part of Ser. No. 867,895, Oct. 20, 1969, abandoned.

[52] U.S. Cl. .......................................... 99/82, 99/83
[51] Int. Cl. ........................... A23l 1/18, A23l 1/10
[58] Field of Search .......................... 99/81, 82, 83

[56] References Cited
UNITED STATES PATENTS

| | | | |
|---|---|---|---|
| 3,104,975 | 9/1963 | Bowman | 99/81 |
| 3,246,990 | 4/1966 | Thompson | 99/82 |
| 3,484,250 | 12/1969 | Vollink et al. | 99/83 |
| 3,544,332 | 12/1970 | Leebens | 99/83 |

*Primary Examiner*—Raymond N. Jones
*Assistant Examiner*—James Robert Hoffman
*Attorney*—Frank E. Robbins, Albert P. Halliun et al.

[57] ABSTRACT

A process for preparing a food snack which uses a particulate starch material having a specified abrasion rating in combination with a small proportion of an oleaginous material and water. This combination is extruded under pressure and at elevated temperature to a puffed, ready-to-eat product.

9 Claims, No Drawings

METHOD FOR PREPARING FOOD SNACK COMPOSITIONS

This application is a continuation-in-part of co-pending application Ser. No. 867,895, filed Oct. 20, 1969, now abandoned.

This invention relates to a process for the preparation of food compositions. More particularly, it relates to the preparation of ready-to-eat, puffed starch products. Such food products are referred to in the art as "snacks."

Food products sold as snack items include a wide variety of things including potato chips, corn chips, corn puffs and the like, and they account for a large dollar volume in the food industry, generally estimated to be in the order of $3,000,000,000 per year. The population growth, coupled with the increase in leisure time, provides a favorable outlook for the growth of this type of business.

Generally, food snacks are eaten apart from a regular meal, for example, as party snacks or as appetizers, sometimes with spreads or fillings or the like. Often, different snack items are served at the same time, perhaps in different snack dishes or in an hors d'oeuvre tray presenting a variety of these and other food items for the choice of household guests or restaurant customers.

These snacks are regarded with discriminating care by the consumer, who regards them more as a source of pleasure rather than nourishment. He makes his choice not so much because of their particular food content, but because of some sort of special aesthetic appeal. The taste of the snack food, its appearance, and its texture are all important in the successful merchandising of a food snack.

Flavor, of course, is a very important consideration. One or more flavoring ingredients invariably are added, usually after the snack is cooked. The more common flavoring ingredients include onion, garlic, bacon, chicken, beef, vanilla, cheese, ham, purees, peanut butter, cocoa, nut meats, soys, and the like. They may be incorporated into the snack item by soaking it in an aqueous solution or suspension of the flavor ingredient, or the flavor ingredient may be dusted onto the cooked snack item as such, or just after it has been wet with a vegetable oil.

Food snacks prepared from corn meal or corn grits have found a prominent place in the market. This has been accomplished despite the presence in an unflavored snack of this type of a strong corn taste. This corn flavor must be masked before any other flavor can be incorporated into the product, and this requires the use of a relatively large amount of flavoring ingredient. A common product of this type is corn curls, which is heavily flavored with cheddar cheese.

It is accordingly an object of the present invention to provide a process for the preparation of ready-to-eat puffed starch products.

Another object of the present invention is to provide such a process which is economical and convenient in operation.

Another object is to provide ready-to-eat puffed starch products which are easily flavored with small proportions of flavoring agents.

These and other objects are accomplished by the process of this invention which comprises preparing a mixture comprising a particulate starch material having an abrasion rating of less than about 30 percent and containing a minor amount of moisture, and a minor proportion of an oleaginous material and forcing said mixture under pressure by means of a screw-type extruder through a relatively small orifice. The product of this process is dried, if desired, then may be treated with flavoring ingredients as desired. Alternatively, flavoring ingredients may be incorporated into the mixture prior to extrusion through the orifice. The product is ready-to-eat, has a good texture and is free of the usual corn flavor normally associated with this type of food snack.

The particulate starch material used as the raw material in this process may be of any type providing it has an abrasion rating of less than about 30 percent. It may be a root or root-type starch such as tapioca, potato, waxy maize, sago, waxy sorghum, while milo, sweet potato or arrow root starch. It may also be a cereal starch such as corn, wheat, rice, sorghum or high amylose corn starch. Because of its ready availability, corn starch is preferred.

Furthermore, the starch material may be starch itself, or it may be an acid-modified starch, a chlorinated starch, dextrins, acid-hydrolyzed starch, enzyme-hydrolyzed starch, etc. Cross-linked starches and derivatized starches are suitable. Any starch-like material having a long polymeric anhydroglucose chain is suitable for use in the process of this invention.

The oleaginous material ordinarily is fatty glyceride such as olive oil or peanut oil. Vegetable oils are a preferred class because of their ready availability and low price, but any oleaginous material will serve the purpose. Olefinically unsaturated fatty glycerides are very suitable. Coconut oil, cottonseed oil, goose fat, hazel nut oil, lard oil, linseed oil, olive oil, palm oil, corn oil, safflower seed oil, etc., are examples of suitable fatty glycerides. Glyceryl monostearate and glyceryl distearate are suitable. Mineral oil may be used. The presence of the oil with the starch material serves to prevent localized overheating in the extruder and thereby diminishes the possibility that the product will be charred. It also results in smoother operation of the extruder and virtually eliminates the necessity for frequent shutdown for purposes of cleaning. It also diminishes dusting. As much as 1 percent based on the weight of the starch material, is effective to serve these purposes and an increase in the advantages resulting from its use is observed with an increase in the concentration of the fatty glyceride up to a level of about 10 percent. Beyond that, the effect does not appear to be increased; furthermore, more than this maximum proportion of oleaginous material diminishes friction to the point where too little heat is generated to cook the starch material. The preferred level of concentration is about 2 percent.

The process involves merely adding the mixture of starch material and fatty glyceride through a hopper into a housing containing a screw which receives the mixture and forces it through the housing and out through a small orifice. The orifice can take many shapes, e.g., so as to produce curls, balls, stars, hats, ovals, rectangles, rounds, shells, chips, flakes, flats, etc.

The screw speed in the extruder may be varied throughout the range of from about 225 to about 650 rpm. A preferred range is from about 300 to about 450 rmp. The screw, or auger, in a preferred instance, is about 5–10 inches long; it compresses the starch material and oleaginous material and the combination of this developed pressure and shearing action causes the temperature of the starch-oil mixture within the housing to rise to above about 100°C. The developed pressure is believed to be of the order of 350–500 psi. The residence time of the starch-fatty glyceride is but a matter of seconds and as it emerges from the orifice it is immediately puffed to several times its previous volume. The extruded material may be cut into relatively short lengths by a rotating knife. The extruded or expelled starchy product is fully cooked and readily digestible.

The starch material, as indicated earlier, may be any particulate starch-like product, providing it has an abrasion rating of less than about 30 percent. A particularly preferred material, however, is an acid-modified starch. It has been found that the abrasion characteristics of the starch material as noted herein are related to the performance of the material in the process of this invention. Thus, starch material having an abrasion rating of less than 30 percent is suitable, however, one having a rating above this level will not ordinarily be extruded satisfactorily. Particularly preferred starch materials are those having abrasion ratings less than 20 percent. The abrasion rating of a starch material is determined by placing a 200-gram sample in a 100-mesh sieve and shaking it for 5 minutes, then weighing the material in the pan, i.e., that which has passed through the sieve, and designating it "original dust." The remaining material on the sieve is placed in a two-quart Mason jar and the jar is rotated at 75 rpm for 60 minutes; this material then is shaken through the 100-mesh sieve for 5 minutes and the material in the pan is designated "abrasion dust." The percent abrasion is determined as follows:

% Abrasion = (Abrasion Dust, g × 100)/(200 g − Original Dust, g)

A particularly suitable starch material is one which has been acid-modified to a Scott viscosity of about 15 grams/44 seconds, then spray dried (or flash dried) to a moisture content of about 12 percent. This dried material is compacted by passing through heavy rolls from which it emerges in the form of a sheet; this sheet is powdered in a hammer mill. Other known methods of preparing starch having these characteristics may, of course, be used.

The starch material ordinarily contains about 10–15 percent moisture which is effective in the overall process to cause the extrudate to expand to several times its volume prior to extrusion. As the material is extruded, there is an immediate pressure drop and the moisture entrapped within the extrudate causes it to puff out to as much as 1200 percent its previous volume.

The particle size of the starch material should be such that it passes through a 2½-mesh sieve (U.S.S.S.) having 0.315 inch openings, and preferably through a 4-mesh sieve having 0.187 inch openings. No more than 50 percent should pass through a 140-sieve having 0.0041 inch openings.

As the starch-oleaginous material mixture emerges from the extruder it contains some moisture and this may be substantially removed by passing the extrudate through a drier. In most instances, it is desirable to have a moisture content in the final ready-to-eat material, of about 1–3 percent. The extrudate generally contains about 5–10 percent moisture. Additional fatty glyceride may be applied to the extrudate, e.g., by spraying, so as to comprise up to 20 percent by weight of the ready-to-eat snack material. It enhances the flavor and also serves as a vehicle for additional flavoring ingredients and coloring agents.

The following specific examples are illustrative of the invention. All parts and percentages herein, unless otherwise expressly stated, are by weight.

EXAMPLE 1

A homogeneous mixture of 98 parts of an acid-modified corn starch having a Scott viscosity of 15 grams/44 seconds and 2 parts of a hydrogenated vegetable oil are fed into the hopper of a housing containing a 6-inch horizontal screw having a 3-inch diameter and 1-inch pitch. The acid-modified starch has an abrasion rating of 15 percent, a moisture content of 12 percent, and a particle size such that all of it passes through a 4-mesh sieve (U.S.S.S.) having 0.187 inch openings and no more than 7 percent passes through a 28-mesh sieve (Tyler) having 0.0232 inch openings. The screw is operated at 400 rpm, and the starch-oil is fed into the hopper at such a rate as to produce extrudate at the rate of 300 lbs. per hour. The extrudate contains 8.5 percent moisture which is decreased to 3 percent by drying on trays in an oven at 150°F. The dried material then is sprayed with hydrogenated vegetable oil and a cheese flavoring agent added.

EXAMPLE 2

Several starches of varying abrasion ratings are each homogeneously mixed with 1 to 2 parts of vegetable oil. The premixed blends are extruded in the manner described in Example 1. Each of the starch samples contained 11.0 to 12.5 percent water. In some samples, additional water is added with no apparent effect on the results or the operation of the extruder. The characteristics of each of the starches in the tests are set forth in the following Table.

| Trial No. | Type Of Starch | Premix Additives Oil Added | Premix Additives H₂O Added | Abrasion Rating |
|---|---|---|---|---|
| 1 | Acid thinner granulated corn starch | 1% | 2% | 8.5% |
| 2 | " | 2% | 0% | 8.5% |
| 3 | Granulated unmodified corn starch | 1% | 2% | 28.8% |
| 4 | " | 1% | 0% | 28.8% |
| 5 | Unmodified non-granulated corn starch | 1% | 2% | 38.1% |
| 6 | " | 1% | 2% | 38.1% |

The granulated starch used in Trials 1 and 2 has a Scott viscosity of 15 grams/40–48 seconds. The starches used in Trials 3–6 have a Scott viscosity of 12 grams/70 seconds. The particle size of the starches used in Trial Nos. 1–4 is such that all of it passes through a 4-mesh sieve (U.S.S.S.) having 0.187 inch openings and no more than 7 percent passes through a 28-mesh sieve (Tyler) having 0.0232 inch openings. The particle size of the starch used in Trials 5 and 6 is such that substantially all of it passes through a 10-mesh sieve (U.S.S.S.) having 0.787 inch openings and more than 50 percent passes through a 140-mesh sieve having 0.0041 inch openings.

Trial Nos. 1 and 2 produced an excellent extrudate with no feeding or extruding problems. The product is a ready-to-eat bland food which can be modified by drying and spraying with hydrogenated vegetable oil and a flavoring agent. In Trial Nos. 3 and 4, minor feeding problems were encountered due to the higher abrasion rating of the starch. In Trial Nos. 5 and 6, wherein the percent abrasion ratings of the starch averaged 38.1 percent, the starch could not be extruded because the product bridged in the opening of the extruder causing a feeding stoppage.

It is apparent from the above comparative tests, that the abrasion rating and particle size of the starch is critical to the successful extrusion of the starch. Therefore, it is essential to the successful operation of the invention that the granulated starch material have an abrasion rating of less than about 30 percent, however, better results are obtainable with granulated starches having an abrasion rating of less than about 20 percent and the particle size of the granulated starch material is such that less than 50 percent will pass through a sieve screen having 0.0041 inch openings.

The mixture of starch material and fatty glyceride used in the process of this invention may contain substantial proportions of corn grits, i.e., dehulled and degerminated corn. In these instances, the abrasive character of the starch material is not so critical and the abrasion rating of a starch material in such a mixture may be somewhat higher than otherwise, although it still should be less than about 30, however, an abrasion rating of less than about 50 can be tolerated when 50 percent or more of the mixture contains corn grits. An illustrative mixture of this sort contains 40 parts of starch, 56 parts of corn grits and 4 parts of hydrogenated vegetable oil.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:
1. A process for preparing a puffed food product which comprises:
   1. preparing a mixture consisting essentially of:
      a. a major portion of a particulate, granulated starch material having an abrasion rating of less than 30 percent, wherein the particle size is such that less than 50 percent thereof will pass through a sieve screen having 0.0041 inch openings and containing from about 10 to about 15 percent moisture; and
      b. a minor portion of an oleaginous material in an amount from about 1 to about 10 percent by weight of said starch;
   2. forcing said mixture under pressure by means of a screw-type extruder through a relatively small orifice so as to raise the temperature of said mixture prior to said extrusion to above about 100°C and to cook said mixture by the combination of the developed pressure and shearing action in said extruder, and upon said extrusion to cause vaporization of said absorbed moisture to puff and expand the extrudate to several times its previous volume.

2. The process of claim 1 wherein the particle size of the starch material is such that it will pass through a 2½-mesh sieve screen having 0.315 inch openings but less than 50 percent thereof will pass through a 140-mesh sieve screen having 0.0041 inch openings.

3. The process of claim 2 wherein the starch material has an abrasion rating of less than 20 percent.

4. The process of claim 1 wherein said puffed extrudate is dried to a moisture content of less than 5 percent and a vegetable oil is applied to said dried extrudate.

5. The process of claim 1 wherein the oleaginous material is a hydrogenated vegetable oil.

6. The process of claim 1 wherein the starch material is an acid-modified starch.

7. The process of claim 1 wherein the starch material is derived from corn.

8. The process of claim 1 wherein the starch material is derived from white milo.

9. The process of claim 1 wherein the starch material and oleaginous material additionally contains a substantial proportion of dehulled and degerminated corn.

* * * * *